(12) United States Patent
Pohl et al.

(10) Patent No.: US 11,893,821 B2
(45) Date of Patent: Feb. 6, 2024

(54) SENSOR DEVICE, METHOD FOR FORMING A SENSOR DEVICE, CARRIER TAPE, CHIP CARD AND METHOD FOR FORMING A CHIP CARD

(71) Applicant: Infineon Technologies AG, Neubiberg (DE)

(72) Inventors: Jens Pohl, Bernhardswald (DE); Frank Pueschner, Kelheim (DE)

(73) Assignee: Infineon Technologies AG, Neubiberg (DE)

( * ) Notice: Subject to any disclaimer, the term of this patent is extended or adjusted under 35 U.S.C. 154(b) by 306 days.

(21) Appl. No.: 17/216,795

(22) Filed: Mar. 30, 2021

(65) Prior Publication Data
US 2021/0303813 A1 Sep. 30, 2021

(30) Foreign Application Priority Data
Mar. 31, 2020 (DE) .......... 102020108927.9

(51) Int. Cl.
*G06V 40/13* (2022.01)
*H01Q 7/00* (2006.01)

(52) U.S. Cl.
CPC .......... *G06V 40/1306* (2022.01); *H01Q 7/00* (2013.01)

(58) Field of Classification Search
CPC .............. H04B 5/0075; H04B 5/00–06; G06V 40/12–1394; G06V 40/10–197; H01Q 7/00–08; H01Q 1/2216; H01Q 1/2225; H01Q 1/2283; H01Q 1/29; H01Q 21/29; H01L 21/561; H01L 2224/49175; H01L 21/00–86; H01L 24/00–98; H01L 2224/00–98; H01L 2924/00–40503; G06F 21/32; G06F 1/10; G06F 1/263; G06F 1/3206; G06F 1/3243; G06F 11/3024; G06F 11/3062; G06F 21/602; G06F 21/6245;

(Continued)

(56) References Cited

U.S. PATENT DOCUMENTS 7,193,282 B2   3/2007   Weng et al.
2005/0139685 A1*  6/2005   Kozlay ............ G06K 19/07354
                                                235/492

(Continued)

FOREIGN PATENT DOCUMENTS

EP        3543897 A1    9/2019

OTHER PUBLICATIONS

Honnegowda et al. | Embedded Electronic Smart Card for Financial and Healthcare Information Transaction | Mar. 2013 | Journal of Advances in Computer Networks | vol. 1, No. 1 | p. 57 (Year: 2013).*

(Continued)

*Primary Examiner* — Amr A Awad
*Assistant Examiner* — Aaron Midkiff
(74) *Attorney, Agent, or Firm* — Banner & Witcoff Ltd.

(57) ABSTRACT

A sensor device including a fingerprint sensor and an antenna. The a fingerprint sensor has a silicon-based area sensor, a sensor area, and an electrically conductive contact region arranged laterally adjacent to the sensor area and configured to be touched upon the contact area being touched by a finger in order to bring the finger to a predetermined potential. The antenna is coupled to the fingerprint sensor to inductively couple the fingerprint sensor to a booster antenna.

10 Claims, 17 Drawing Sheets

(58) Field of Classification Search
CPC ............... B32B 2425/00; G06K 19/02; G06K 19/07722; G06K 19/07735; G06K 19/07747; G06K 19/0775; G06K 19/07769; G06K 19/07771; G06K 19/07775; G06K 19/07781; G06K 19/07783; G06K 19/07794; G06K 19/07–07798; H01F 38/14; H05K 1/165; H05K 3/103; H05K 2201/10098; Y10T 29/49018; Y10T 29/49162; Y02D 30/70; H04W 52/0261; H04W 52/0277; H04W 52/0296
USPC ........................................................ 382/124
See application file for complete search history.

(56) References Cited

U.S. PATENT DOCUMENTS

| | | | |
|---|---|---|---|
| 2012/0049309 A1 | 3/2012 | Kiyomoto et al. | |
| 2018/0174013 A1* | 6/2018 | Lee .................. | G06K 19/07707 |
| 2019/0286868 A1* | 9/2019 | Suwald .............. | G06K 19/0718 |
| 2019/0340398 A1* | 11/2019 | Mosteller ........... | G06K 7/10366 |
| 2020/0051061 A1 | 2/2020 | Gandolfo | |

OTHER PUBLICATIONS

German Patent Office, Office Action issued for DE 102020108927.9, 8 pgs., dated Jan. 8, 2021.

\* cited by examiner

FIG. 1A
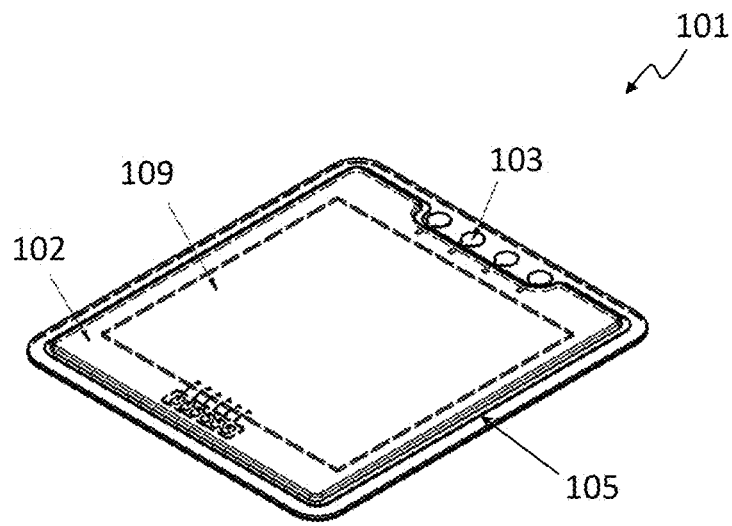
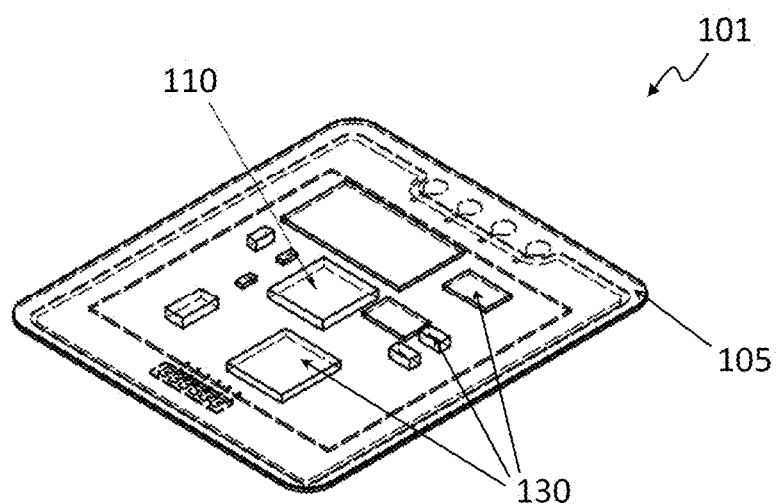

FIG. 1C
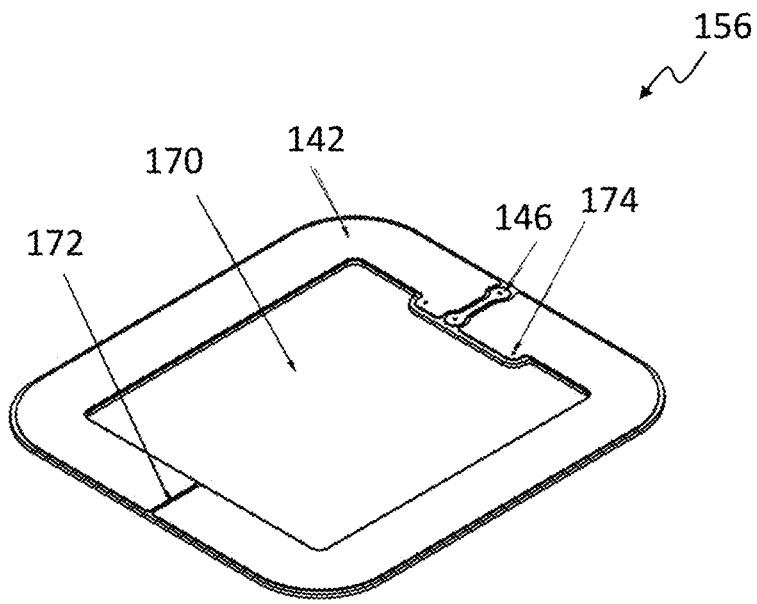
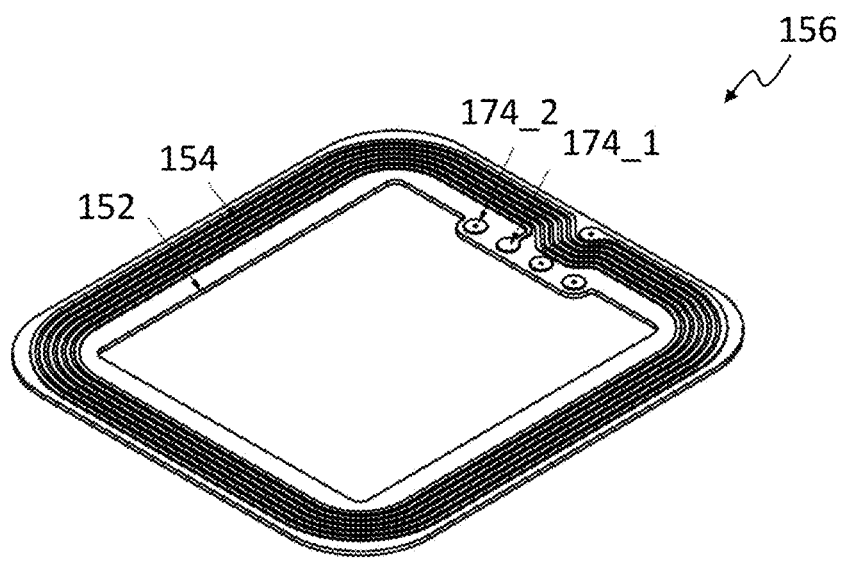

FIG. 1D
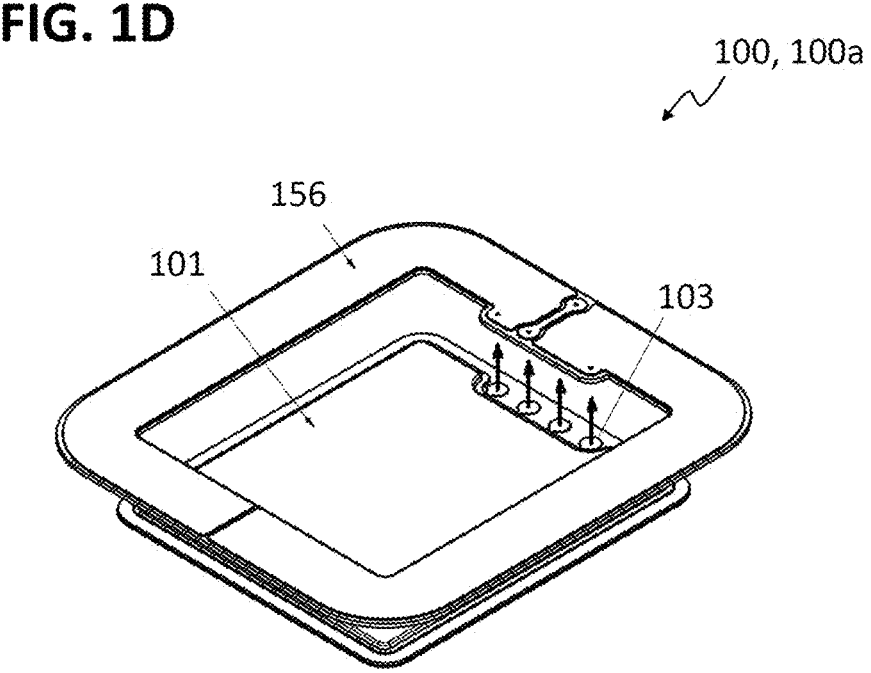
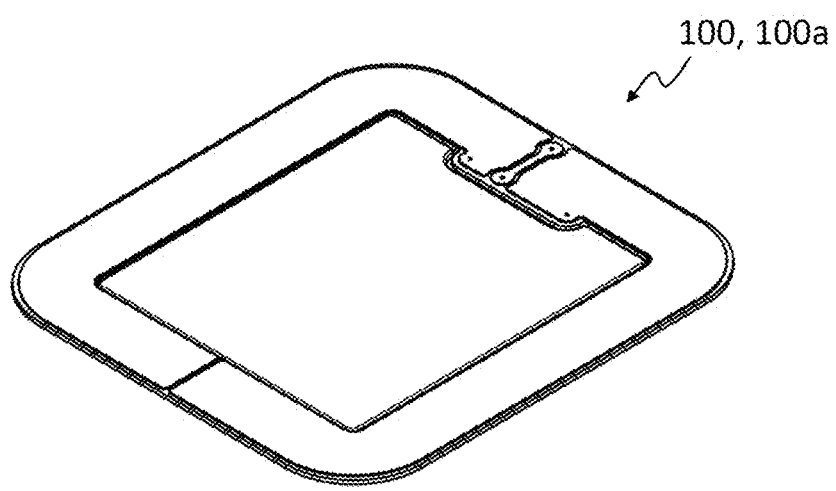

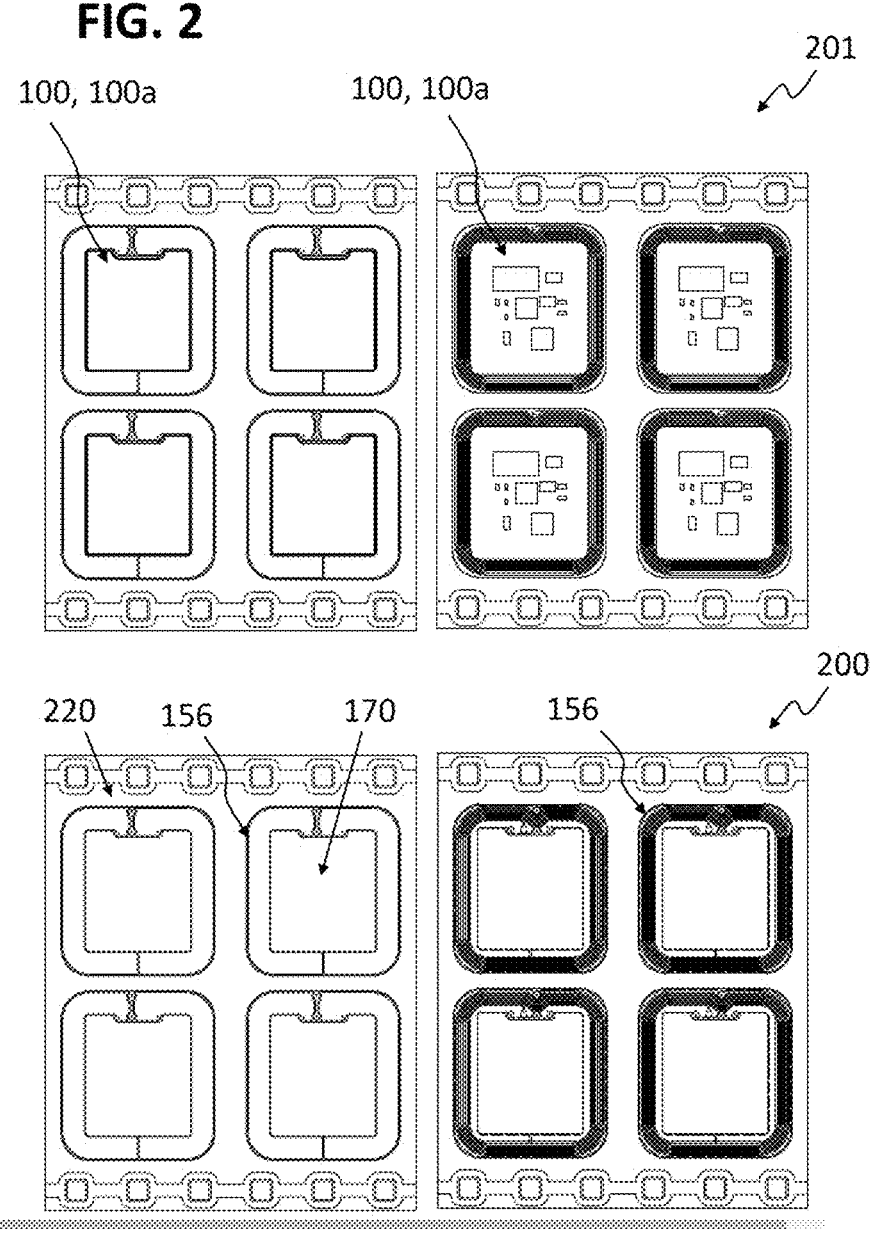

FIG. 5
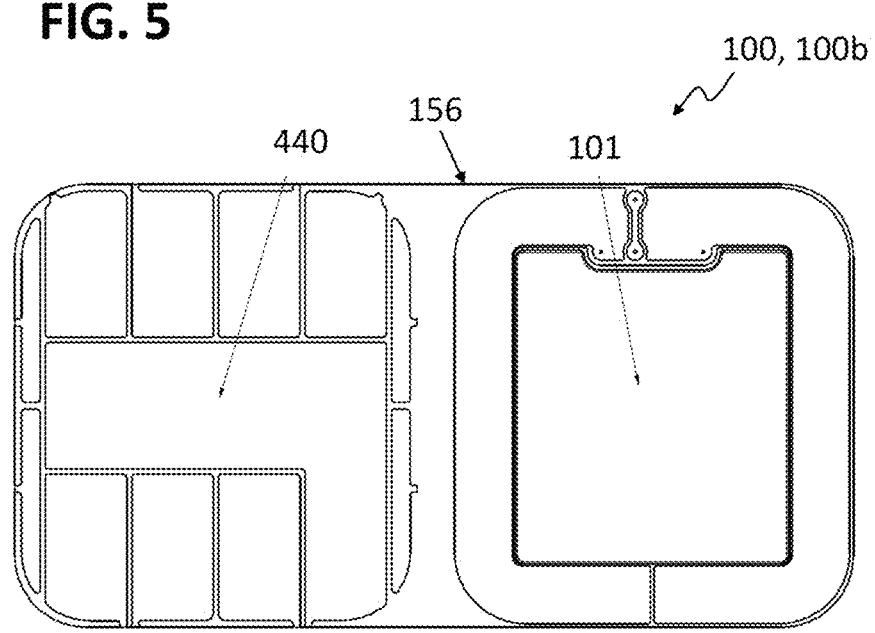
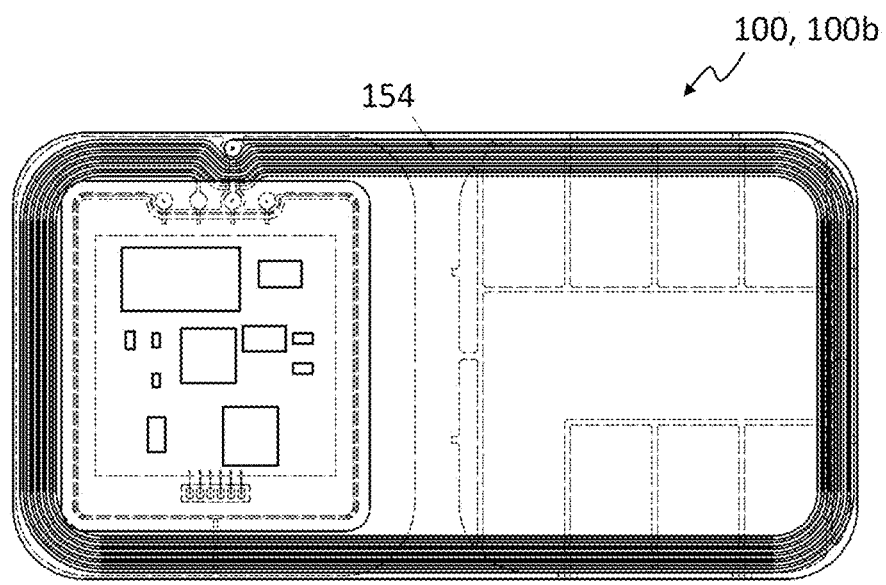

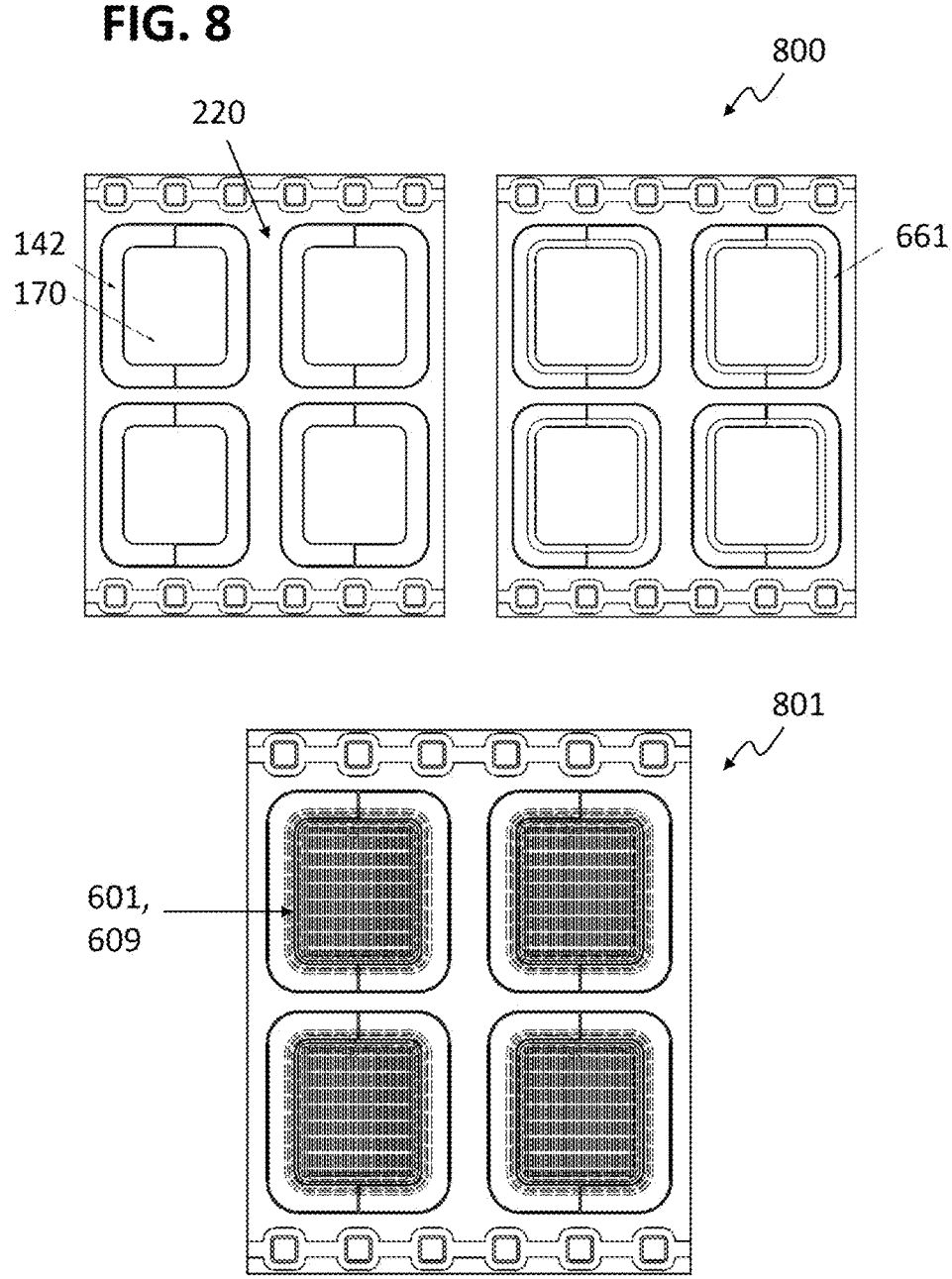

FIG. 10
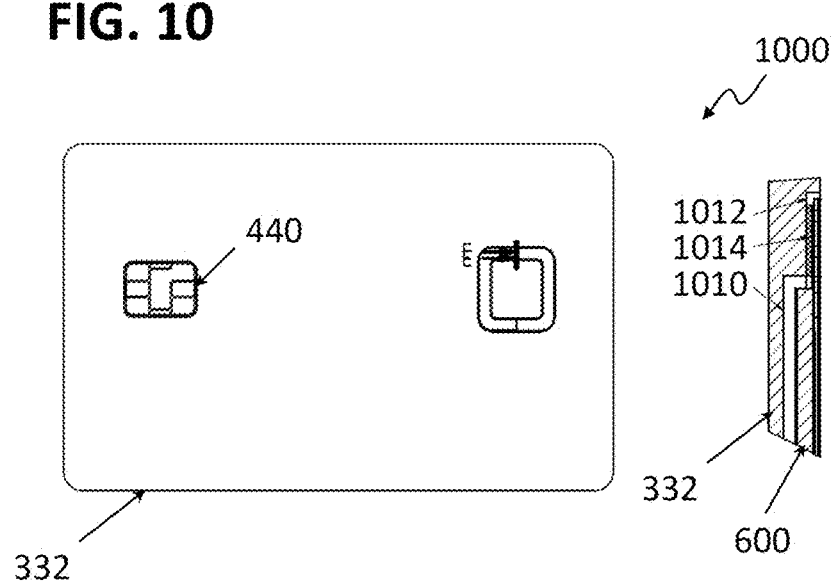
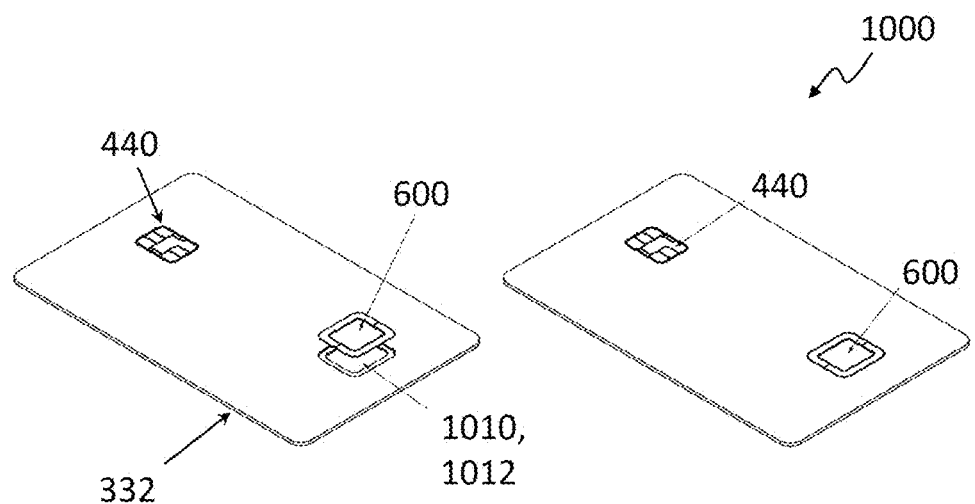

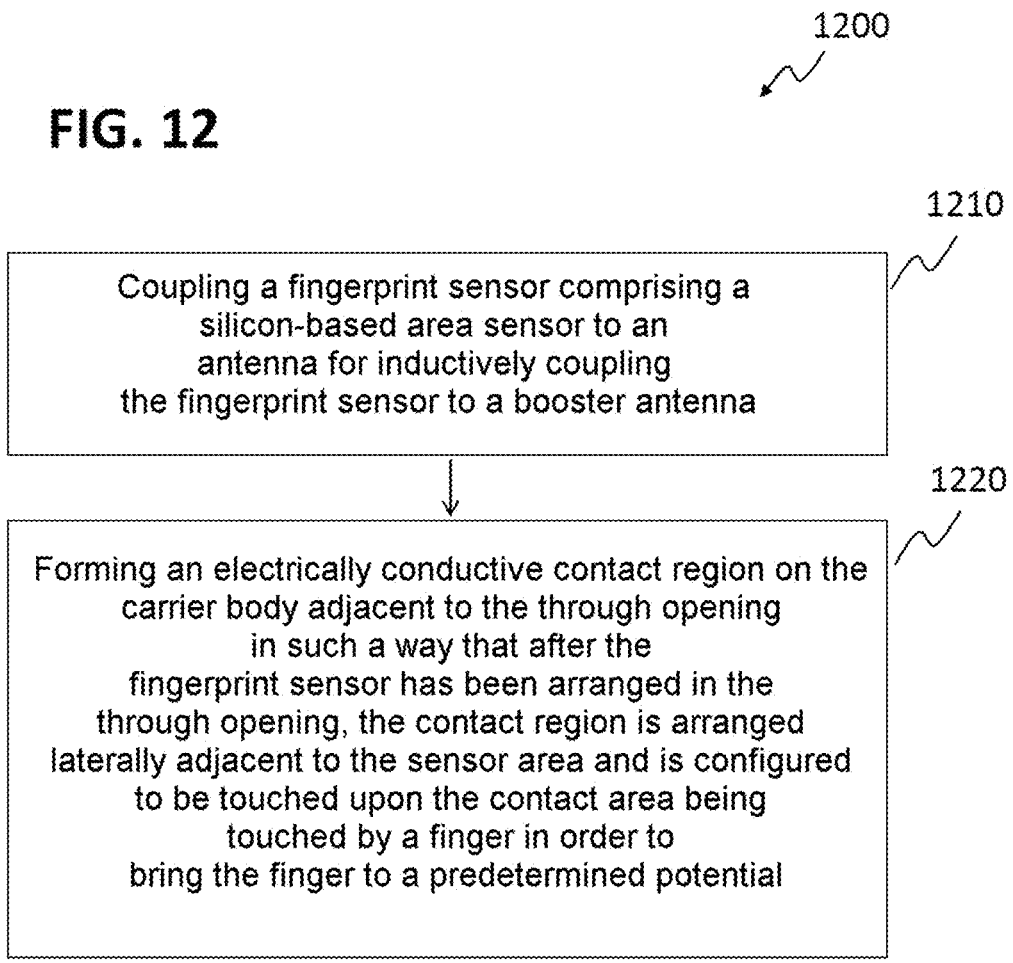

SENSOR DEVICE, METHOD FOR FORMING A SENSOR DEVICE, CARRIER TAPE, CHIP CARD AND METHOD FOR FORMING A CHIP CARD

TECHNICAL FIELD

The disclosure relates to a sensor device, a method for forming a sensor device, a carrier tape, a chip card and a method for forming a chip card.

BACKGROUND

Nowadays there is a clear trend toward chip cards (or smart cards), e.g. for banking applications or access permits, which are provided with biometric sensors for authentication, e.g. with fingerprint sensors.

However, these cards have a complex construction with a plurality of components electrically connected to one another. By way of example, the fingerprint sensor can be electrically conductively connected to a chip (which can provide security-relevant functions and is then also referred to as a secure element) and to an antenna.

For wide acceptance, mass market applications, such as e.g. payment/banking applications, must firstly be cost-effective and secondly satisfy prescribed reliability and/or security requirements, e.g. comply with the demands of the CQM standard with regard to mechanical reliability.

The known art has proposed various fingerprint sensors that differ with regard to a type of sensor, a sensor material and a method for assembling the smart card.

SE 175 836 A1 describes a fingerprint module comprising a fingerprint sensor, which is introduced into an opening in a substrate and is electrically conductively connected to an RFID antenna used both for communication and for obtaining energy for the sensor.

In accordance with a known mounting technology, a T-shaped chip module is used, although it is not configured for a contactless use.

There is a need for a cost-effective, reliable and easily mounted biometric sensor (e.g. a fingerprint sensor) for integration into a chip card, e.g. into a so-called smart card. This need exists both for silicon-based biometric sensors described above, and for printed-circuit-board-based (PCB-based) biometric sensors for chip cards.

PCB-substrate-based biometric fingerprint sensors are typically produced from PCB panels and singulated therefrom e.g. by means of stamping, milling or cutting. The chip modules are then present as individual modules, which does not constitute a form of standard provision for the production of a smart card.

Hitherto, PCB-substrate-based biometric fingerprint sensors for biometric smart cards have not yet been mass-produced goods, and so hitherto the requirement has not yet arisen to revise the production concepts in the direction of suitability for mass production.

For mass production, however there is a need for production methods for PCB-substrate-based biometric fingerprint sensors which are suitable therefor. For this purpose, it might be useful to be able to use currently employed mounting methods, e.g. implanting modules and sensors with standard chip card implanting equipment, e.g. by means of a hotmelt implantation.

SUMMARY

In various exemplary aspects, a sensor device, e.g. a chip module with a fingerprint sensor, is provided which is implantable into a chip card body easily and in a manner suitable for mass production.

In various exemplary aspects, the sensor device can be assembled from a first component and a second component, which are easily couplable. In this case, the first component can comprise the fingerprint sensor and is accordingly also referred to as sensor component, and the second component can be a carrier having an opening, in which the first component is arranged, and is therefore also referred to as carrier component.

In various exemplary aspects, the carrier can be a standard 35 mm carrier tape for roll-to-roll production of chip modules. This can make it possible that the sensor device (chip module) implantation into the chip card body can be effected on standard machines, for example on the part of the end customer. During standard further processing, the sensor device can be singulated e.g. stamped out, from the carrier tape and be implanted into the chip card body, for example by means of a hotmelt process.

To put it another way, the standard 35 mm carrier tape constitutes the known form of provision for the chip modules and forms (e.g. after stamping out) a part of the sensor device.

In various exemplary aspects, a (for example complex) sensor component is combined with a (simple) 35 mm carrier tape in order to add a further functionality to the sensor component, e.g. providing a mounting region for mounting as standard chip module, and thus to the sensor device formed thereby in a standard form of provision.

In various exemplary aspects, the sensor device (also referred to as sensor module) can comprise the sensor, e.g. a fingerprint sensor, and an integrated (coupling) antenna.

In various exemplary aspects, the sensor module can be inserted into a chip card (e.g. a smart card) that uses a Coil-on-Module (CoM) technology. In CoM technology, a large antenna (the so-called booster antenna) for communication with a smart card reader is situated in a card body of the smart card and couples inductively to a (significantly smaller) antenna that is part of a chip card module.

In various exemplary aspects, a connection between the sensor module and a booster antenna arranged in a chip card body can be produced by means of inductive coupling. The inductive coupling can be used both for data transmission and for energy supply for operation of the sensor.

In various exemplary aspects, a cost-effective, reliable and easily assembled sensor device, e.g. having a fingerprint sensor, is provided. In various exemplary aspects, the sensor device can be integrated into a chip card, e.g. a smart card. Since the integration into the card is also effected in a simple and cost-effective manner, the chip card in accordance with various exemplary aspects is likewise cost-effective.

In various exemplary aspects, a coil-on-fingerprint sensor module is provided. This makes it possible to provide a complex sensor system as a single package assembled from two components. An improvement in the functionality can be achieved by means of providing a standard booster antenna in a carrier, into which the coil-on-fingerprint sensor module can be embedded.

BRIEF DESCRIPTION OF THE DRAWINGS

Exemplary aspects of the disclosure are illustrated in the figures and are explained in greater detail below. In the figures:

FIG. 1A shows schematic plan views of the front side and the rear side of a sensor component of a sensor device in accordance with various exemplary aspects;

FIG. 1C shows schematic plan views of the front side and the rear side of a carrier component of a sensor device in accordance with various exemplary aspects;

FIG. 1D shows an illustration of a process of coupling a sensor component and a carrier component in order to form the sensor device in accordance with various exemplary aspects;

FIG. 2 shows a schematic plan view of a front side and a rear side of a carrier tape with a plurality of sensor devices in accordance with various exemplary aspects and a schematic plan view of a front side and a rear side of a carrier tape in which the sensor components have not yet been mounted;

FIG. 5 shows a schematic plan view of a front side and a rear side of a sensor device in accordance with various exemplary aspects;

FIG. 8 shows a schematic plan view of a front side and a rear side of a carrier tape and a front view of a carrier tape with a plurality of sensor devices in accordance with various exemplary aspects;

FIG. 10 shows a schematic plan view of a chip card in accordance with various exemplary aspects with a cross-sectional view of a partial region and an illustration of a process of mounting the sensor device in the chip card body;

FIG. 12 shows a flow diagram of a method for forming a sensor device in accordance with various exemplary aspects.

DETAILED DESCRIPTION

In the following detailed description, reference is made to the accompanying drawings, which form part of this description and show for illustration purposes specific aspects in which the disclosure can be implemented. In this regard, direction terminology such as, for instance, "at the top", "at the bottom", "at the front", "at the back", "front", "rear", etc. is used with respect to the orientation of the figure(s) described. Since components of aspects can be positioned in a number of different orientations, the direction terminology serves for illustration and is not restrictive in any way whatsoever. It goes without saying that other aspects can be used and structural or logical changes can be made, without departing from the scope of protection of the present disclosure. It goes without saying that the features of the various exemplary aspects described herein can be combined with one another, unless specifically indicated otherwise. Therefore, the following detailed description should not be interpreted in a restrictive sense, and the scope of protection of the present disclosure is defined by the appended claims.

In the context of this description, the terms connected, attached and coupled are used to describe both a direct and an indirect connection, a direct or indirect attachment and a direct or indirect coupling. In the figures, identical or similar elements are provided with identical reference signs, insofar as this is expedient.

In order to differentiate between exemplary aspects, some apparatuses, devices, components, etc., in addition to being provided with a generic reference sign, may also be provided with a reference sign which has the generic reference sign followed by a lower case letter.

Figure 13:
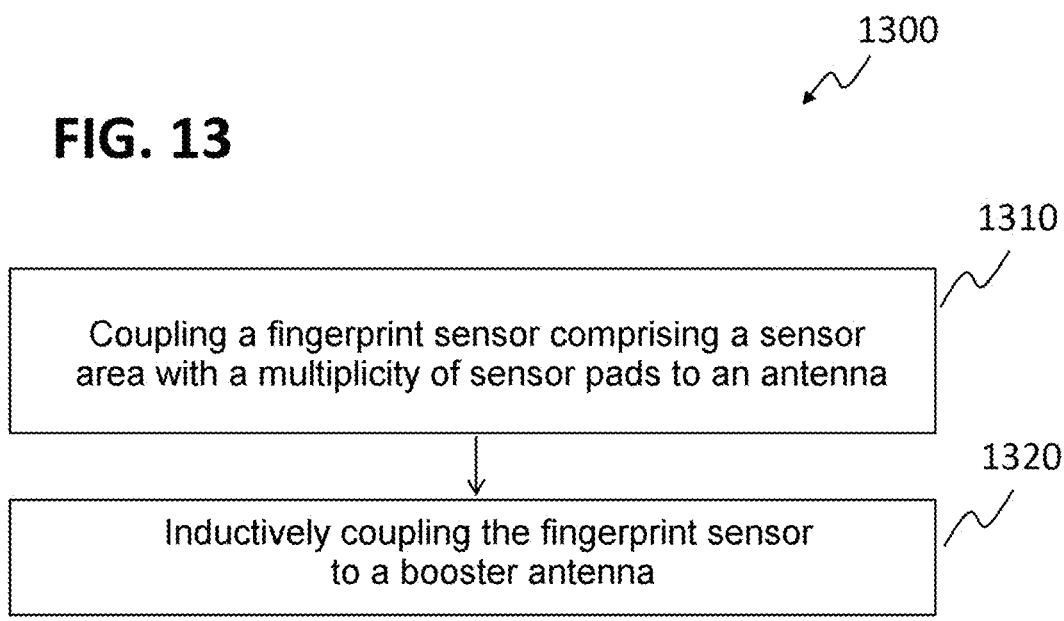
FIG. 13 shows a flow diagram of a method for forming a sensor device in accordance with various exemplary aspects.

FIG. 1A shows schematic plan views of the front side and the rear side of a sensor component 101 of a sensor device 100 in accordance with various exemplary aspects, FIG. 13 shows a schematic cross-sectional view of a sensor device 100 in accordance with various exemplary aspects, FIG. 1C shows schematic plan views of the front side and the rear side of a carrier component 101 of a sensor device 100 in accordance with various exemplary aspects, and FIG. 1D shows an illustration of a process of coupling a sensor component 101 and a carrier component 156 in order to form the sensor device 100 in accordance with various exemplary aspects.

Figure 3:
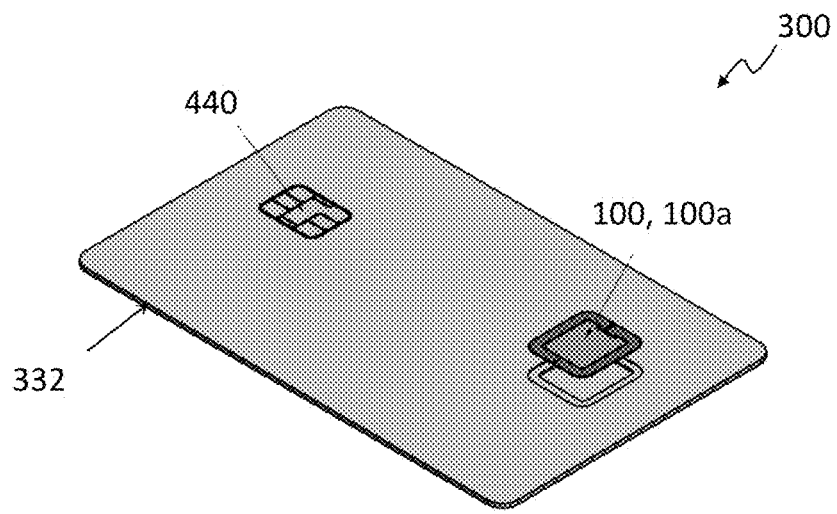
FIG. 3 shows a schematic perspective illustration of a chip card in accordance with various exemplary aspects.
Figure 4:
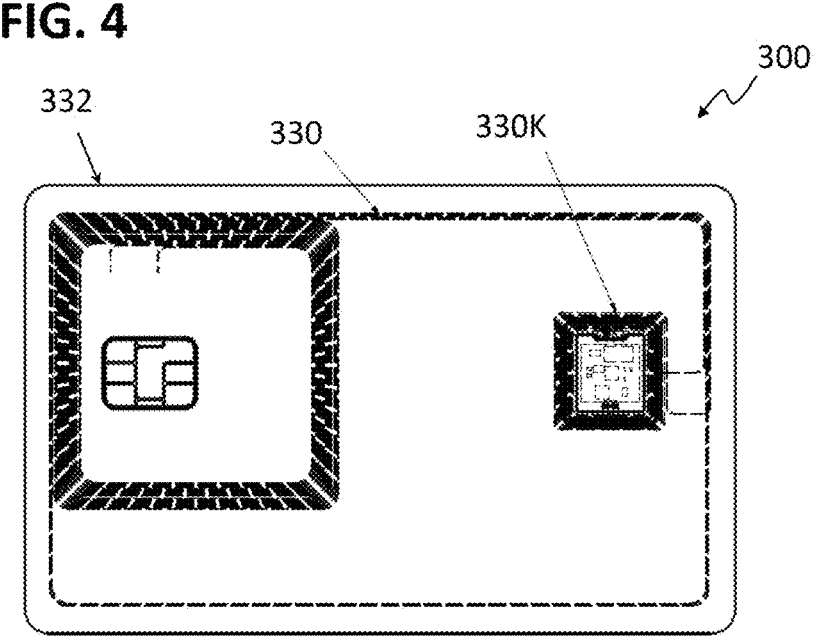
FIG. 4 shows a schematic plan view of a chip card in accordance with various exemplary aspects.

In addition, FIG. 3 shows a schematic perspective illustration of a chip card 300 in accordance with various exemplary aspects, FIG. 4 shows a schematic plan view of a chip card 400 in accordance with various exemplary aspects, and FIG. 5 shows a schematic plan view of a front side and a rear side of a sensor device in accordance with various exemplary aspects.

The sensor device 100 can comprise a fingerprint sensor 109. The fingerprint sensor 109 can comprise a silicon-based area sensor having a sensor area 1015 and can accordingly also be referred to as sensor chip 109. The sensor chip 109 can be part of a sensor component 101.

The fingerprint sensor 109 can be arranged on a top side of a printed circuit board (PCB) 105, which forms a substrate 105. The substrate 105 can be formed as a multilayered substrate, for example having an upper metal layer, an (electrically insulating) substrate core and a lower metal layer. The substrate can optionally comprise further solder mask layers.

In various exemplary aspects, the sensor chip 109 can be electrically conductively connected to the upper metal layer of the substrate 105 by means of wire bonding (e.g. by means of a wire 158).

The sensor chip 109 can be encapsulated with a cap composed of encapsulation material 102, for example an epoxy-based potting compound.

A flat surface of the encapsulation material 102 can form a sensor region, which is touched by a user's finger for the purpose of fingerprint detection.

Accordingly, the sensor region of the encapsulation material 102 can be exposed, such that the fingerprint sensor 109 is able to be touched by a finger and is configured to detect fingerprint features of the finger.

If on the top side of the substrate 105 there is still free space available in the encapsulated region, further components, for example a sensor evaluation chip 110 and/or further circuit elements 130 (which can also comprise a second chip, for example), can be arranged on the top side of the substrate 105. Otherwise, the second chip 130 and/or the circuit elements 130 can be arranged on the underside of the substrate 105. This is illustrated by way of example in FIG. 1A (at the bottom).

The sensor evaluation chip 110 and optionally further chips can be applied by means of flip-chip mounting (FC mounting) (for example soldered as a so-called "Surface Mounted Device" SMD, adhesively bonded, etc.).

However, other or further connection technologies such as wire bonding can likewise be used. The additional circuit elements 110, 130 can comprise for example a security chip (also referred to as Secure Element (SE)) 110, a microcontroller unit (MCU), an energy source (e.g. a voltage supply that provides energy that is received by means of a booster antenna from an electromagnetic field generated by an external reader) and/or additional active and/or passive components that facilitate or enable for example a function of the fingerprint sensor 101.

Furthermore, the sensor component 101 can comprise LEDs for communication with the user, for example in order to indicate by means of a green light that a chip card 300 in which the sensor device 100 can be integrated is working (e.g. as envisaged).

A height of the additional components can be chosen such that the total thickness of the sensor component 101 does not exceed approximately 550 µm, in order that the sensor component 101 is insertable (i.e. implantable) into the smart card 300.

In various exemplary aspects, the upper metal layer on the substrate 105 can furthermore comprise exposed (i.e. non-encapsulated) contacts 103 configured to form an electrically conductive connection to the carrier component 156, in particular to the matching contact pads 174. In this respect, see FIGS. 1A, 1C and 1D for example.

In various exemplary aspects, such contacts can be formed as part of the lower metal layer of the substrate 105. An electrically conductive contacting 148, 150 to the carrier component 156 can then be formed by means of wire bonding, for example. That is illustrated by way of example in FIG. 1B.

The cap composed of encapsulation material 102 can be formed such that on the substrate there is an edge region having a width of approximately 200 µm to approximately 1000 µm, e.g. between 400 µm and 800 µm, which is free of the encapsulation material 102. This (e.g. flat) edge region on the top side of the sensor component 101 can be provided for connecting the sensor component 101 to the carrier component 156.

The sensor device 100 can furthermore comprise an electrically conductive contact region 142 arranged laterally adjacent to the sensor area 1015. The contact region 142 can be formed for example as a metal area, for example as a metal layer 142 on an electrically insulating substrate 152. The electrically insulating substrate 152 and the electrically conductive contact region 142 can be part of the carrier component 156.

The contact region 142 can be configured likewise to be touched upon the contact area 1015 being touched by the finger in order to bring the finger to a predetermined potential, for example to a grounding potential. That may be necessary for operation of the silicon-based, for example capacitive, fingerprint sensor 109.

In various exemplary aspects, the contact region 142 can be electrically conductively connected to the sensor evaluation chip 110 or a circuit connected thereto.

In various exemplary aspects, the sensor device 100 can furthermore comprise an antenna 154 coupled to the fingerprint sensor 109, for inductively coupling the fingerprint sensor 109 to a booster antenna 330 (see FIG. 4).

In various exemplary aspects, the contact region 142 and the antenna 154 can be arranged vertically one above the other, in a manner separated from one another by the electrically insulating substrate 152. In various exemplary aspects, the contact region 142 and the antenna 154 can be arranged laterally offset with respect to one another. An electrically conductive bridge 146 for connecting two ends of the antenna 154 can be arranged on the same side as the contact region 142. FIG. 1C shows an exemplary aspect of the carrier component 156 with the antenna 154 on the underside and the contact region 142 on the top side.

In various exemplary aspects, antenna contact pads 174_1 for forming an electrically conductive contact between the sensor component 101 and the carrier component 156 can be part of the lower metallization layer of the carrier component 156. The antenna contact pads 174_1 can comprise contact pads for the antenna contacts LA/LB, and at least one contact pad 174_2 for each segment of the contact region 142.

Owing to the antenna 154, which can be part of the carrier component 156 and thus part of the sensor device 100, the sensor device 100 can also be regarded as a coil-on-module device.

In order to avoid any disturbing interaction of the contact region 142 with the antenna 154 (for example if, in accordance with one aspect, the antenna 154 is arranged under the electrically conductive contact region 142), the electrically conductive contact region 142 can be formed as an interrupted ring or as a plurality of segments. In the exemplary aspects from FIG. 1C and FIG. 1D, the contact region 142 is formed in each case from two segments. A gap 172 for interrupting or segmenting the contact region 142 can be formed by means of etching, for example.

The carrier component 156 can be formed from a typical chip module substrate 152 having a two-layered metallization 142, 154 (e.g. on the top side and on the underside). A surface finish of the metal layers can correspond for example to that of typical chip card metallizations, for example with copper (Cu) as base material with a cover layer comprising or consisting of nickel (Ni), gold (Au), palladium (Pd) or, for example, a CuSnZn alloy (e.g.) MIRALLOY®.

A thickness of the substrate 152 can be chosen such that after the sensor component 101 has been joined together with the carrier component 156, the cap composed of encapsulation material 102 does not project beyond the metallization of the top side, i.e. beyond the contact region 142.

The fingerprint sensor 109 can comprise a sensor evaluation chip 110, which can be configured for processing detected sensor signals, for example for generating an image of the fingerprint from the sensor signals or some other standardized conditioning of the detected sensor signals that are suitable for being compared with reference sensor signals.

The sensor evaluation chip 110 can be connected to the fingerprint sensor 109 by means of a circuit. In various exemplary aspects, the sensor evaluation chip 110 can be arranged on a side of the sensor component 101 facing away from the sensor area 1015. In addition, in various exemplary aspects, further circuit elements 130 can be provided, for example on the same side of the sensor component 101 as the sensor evaluation chip 110. The further circuit elements 130 can comprise for example a second chip, capacitors (for example for tuning the antenna for the inductive coupling; for this purpose, capacitors can be connected in parallel and/or in series with inductive regions of the antenna 154), diodes, etc. The antenna 154 can be tuned in such a way that its operation is optimized for the frequency of 13.56 MHz, required as standard in accordance with ISO14443.

The conditioned fingerprint signal can be provided for being compared with reference sensor (e.g. fingerprint) signals stored in the sensor device 100 or provided by means of an apparatus external to the sensor device, also referred to as an external reader. The reference fingerprint signals stored in the sensor device 100 can be stored for example in a second chip (not illustrated), which can be configured as a secure element and/or as a so-called security controller.

The second chip can be configured for contactless communication with the apparatus external to the sensor device, wherein the antenna 154 can be electrically conductively connected to the second chip.

Comparing the detected fingerprint with the reference sensor signals, in various exemplary aspects, can be effected in the second chip or, in various exemplary aspects, can be effected in the external reader. If it is determined that the detected fingerprint matches a reference sensor signal, a required action can be enabled, for example a money transaction can be enabled or access can be granted.

Figure 1B:
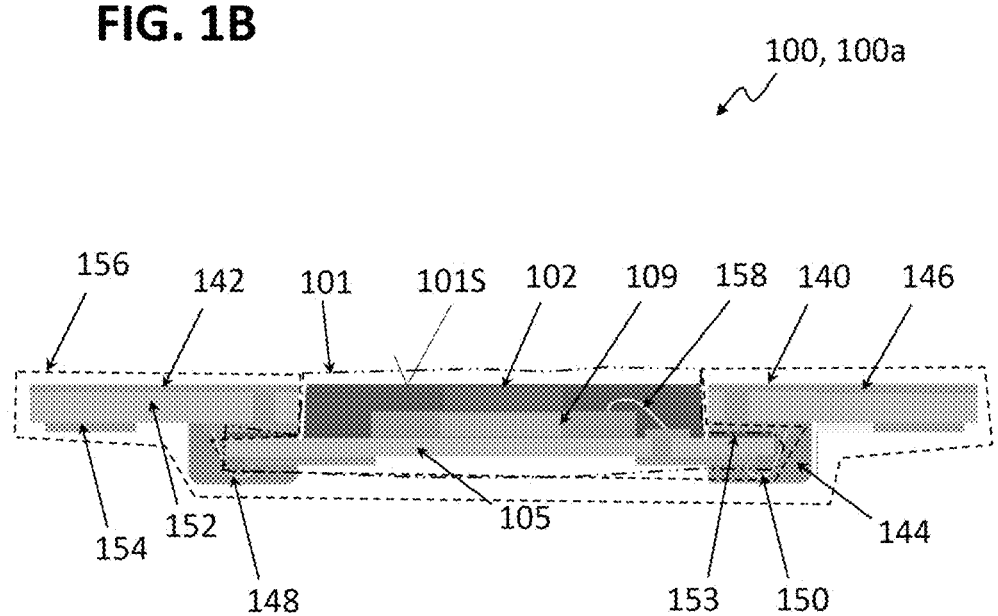
FIG. 1B shows a schematic cross-sectional view of a sensor device in accordance with various exemplary aspects.

FIGS. 1B and 1D illustrate how a connection between the carrier component 156 and the sensor component 101 is formed.

In various exemplary aspects, the carrier component 156 can be provided as part of a carrier tape 200. In this respect, see FIG. 2, in which the carrier tape 200 is illustrated without the sensor component 101 at the bottom, and with the mounted sensor component 101 at the top, in each case as a plan view from above (on the left) and from below (on the right).

The carrier tape can be a standard 35 mm carrier tape for roll-to-roll production of chip modules. That should be understood to mean that the carrier tape 200 satisfies those specifications which are required in order that the carrier tape 200 can be used by means of roll-to-roll production devices currently used in the production of chip modules. Furthermore, the carrier tape 200 can be designed, however, such that it provides the functionality described herein for the sensor device 100, for example the metallization 142, the antenna 154, optionally through contacts for attaching the metallization 142 and/or the antenna 154, etc.

The carrier tape 200 can comprise a carrier tape body 220 having a plurality of (for example stamped) through openings 170, wherein one of the fingerprint sensors 109, for example one of the sensor components 101, is arranged in each of the through openings 170. A respective region around the through openings 170 can form the carrier component 156, which forms a part of the sensor device 100 after the singulation of the sensor device 100.

In particular, for example, the antenna 154 of a respective sensor device 100 of the plurality of sensor devices 100 can be formed on the carrier tape body 220 such that it surrounds the through opening 170 in which the fingerprint sensor 109 is arranged.

In accordance with various exemplary aspects, joining together the sensor component 101 and the carrier component 156 in order to form the sensor device 100 thus takes place on the 35 mm carrier tape 200. Nevertheless, individual sensor devices 100 are illustrated in each case in FIGS. 1B and 1C, for the sake of clarity.

The electrically conductive contact region 142 of a respective sensor device 100 of the plurality of sensor devices 100 can be formed on the carrier tape body 220, specifically in such a way that it surrounds the through opening 170 in which the fingerprint sensor 109 is arranged.

After the sensor components 101 have been inserted into the carrier tape 200, the carrier tape 201 thus comprises a plurality of sensor devices 100, wherein each of the sensor devices 100 comprises a fingerprint sensor 109 and an antenna 154 coupled to the fingerprint sensor 109, for inductively coupling the fingerprint sensor 109 to a booster antenna 330.

FIG. 12 shows a flow diagram 1200 of a method for forming a sensor device in accordance with various exemplary aspects.

The method comprises coupling a fingerprint sensor comprising a silicon-based area sensor to an antenna for inductively coupling the fingerprint sensor to a booster antenna (1210), and forming an electrically conductive contact region on the carrier body adjacent to the through opening in such a way that after the fingerprint sensor has been arranged in the through opening, the contact region is arranged laterally adjacent to the sensor area and is configured to be touched upon the contact area being touched by a finger in order to bring the finger to a predetermined potential (1220).

In various exemplary aspects, connecting the carrier component 156 to the sensor component 101 is carried out on a standard 35 mm carrier tape 200.

During connecting, the contact pads 174 are brought into (electrically conductive) contact with the contacts 103.

Mounting the sensor component 101 on the carrier component 156 (that is to say e.g. on the carrier tape 200) can be effected in one of a number of ways, a number of which are described by way of example below.

The sensor component 101 can be mounted on the carrier component 156 by means of a nonconductive adhesive 153. The adhesive 153 can be applied prior to mounting on the carrier component, the sensor component 101 or both, for example on respective contact regions, for example an (e.g. outer) edge region of the sensor component 101 and/or an (e.g. inner) edge region of the carrier component 156.

In order to ensure a good electrically conductive contact between the contact areas 174 and the contacts 103, an electrically conductive adhesive, for example a fully conductive adhesive or an anisotropic conductive adhesive, can additionally be applied in each case between the contact area/contact pairs contacting one another.

In various exemplary aspects, curing the adhesive 153 can be effected in situ, for example as a so-called snap-cure process while the two components 101, 156 are pressed onto one another in a laminating apparatus. Alternatively, the curing can be effected in a box furnace or in a reflow furnace, for example.

In a departure from the adhesive bonding method described above, the sensor component 101 can be mounted on the carrier component 156 by means of a conductive adhesive (fully conductive adhesive or an anisotropic conductive adhesive).

The adhesive can be applied prior to mounting on the carrier component, the sensor component 101 or both, for example on respective contact regions, for example an (e.g. outer) edge region of the sensor component 101 and/or an (e.g. inner) edge region of the carrier component 156, and additionally between the contact area/contact pairs contacting one another.

What may be advantageous here is that only one type of adhesive is used for connecting the components 101, 156 and the contact area/contact pairs.

The sensor component 101 can be mounted on the carrier component 156 by means of a soldering process. Respective contact regions of the components 101, 156, for example an (e.g. outer) edge region of the sensor component 101 and/or an (e.g. inner) edge region of the carrier component 156, can be designed as a solderable surface.

What may be advantageous here is that only one type of material is used for securing and for electrically conductively connecting the components 101, 156 and the contact area/contact pairs.

The soldering can be carried out in situ, for example in a soldering laminating apparatus. Alternatively, the soldering can be carried out in a reflow furnace, although that may have the disadvantage that other soldered connections on the sensor device may also be melted again.

In various exemplary aspects, the processes described above can be combined with one another. By way of example, an adhesive for fitting the sensor component 101 to the carrier component 156 can be combined with soldering for electrically conductively connecting the contact area/contact pairs.

After the sensor component 101 has been connected to the carrier component 156, the sensor device 100 formed thereby can be embedded into a chip card body 332 in order to form a chip card 300. That is illustrated in FIG. 3.

The antenna 154 of the sensor device 100 and the booster antenna 330, to put it more precisely a coupling region 330K of the booster antenna 330, can be aligned with one another in the chip card 300 such that a coupling strength necessary for operating the sensor device 100 as part of the chip card 300 is achieved. In this respect, see FIG. 4.

As illustrated in FIG. 3 and FIG. 4, in various exemplary aspects, the chip card 300 can furthermore comprise a contact-based chip module 440. The contact-based chip module 440 can comprise a dedicated secure element for contact-based operation of the card. The secure element of the contact-based chip module 440 can be independent of the secure element 110 of the sensor device 100.

FIG. 5 shows a schematic plan view of a front side and a rear side of the sensor device 100, 100b in accordance with various exemplary aspects. As is illustrated in FIG. 5, the sensor device 100, 100b can comprise, in addition to the sensor component 101, a contact-based interface 440 for contact-based communication, which can be formed integrally with the sensor device 100, for example by the carrier component 156 being formed such that it receives both the sensor component 101 and the contact-based interface 440.

In that case the antenna 154 can be formed such that it extends right into the edge region below the contact-based interface. The antenna area can thus be enlarged, which can improve the quality of the contactless transmission.

In various exemplary aspects, a sensor device 100 is provided which is formed as an assembly composed of two different components, a sensor component 101 and a carrier component 156.

What is advantageous about this type of mounting is an optimization of costs. During manufacturing of the sensor component 101, for example, it is possible to realize higher densities if it is effected on a PCB substrate (e.g. panel or strip) compared with if it would have to be carried out directly on the carrier tape 200.

Figure 6A:
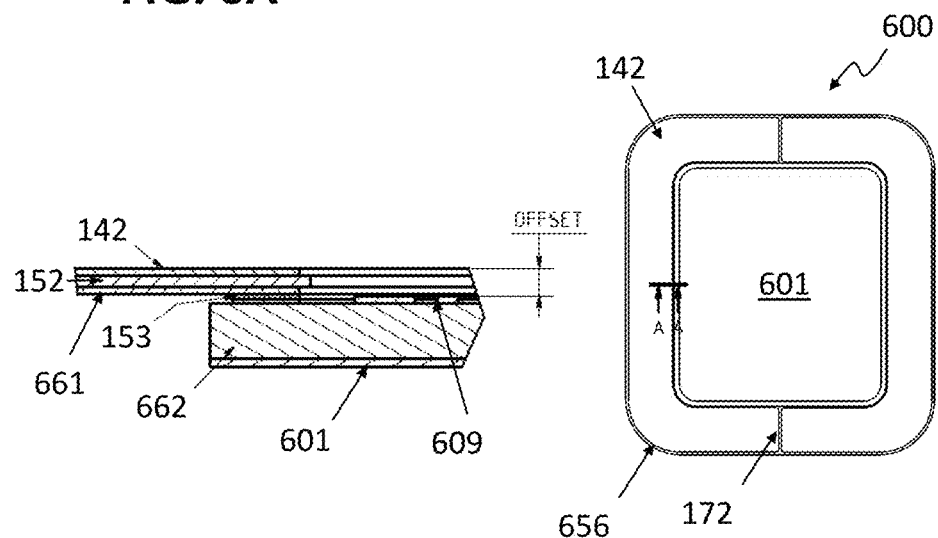
FIGS. 6A to 6C each show a schematic plan view with a partial cross-sectional view of an exemplary aspect of a sensor device in accordance with various exemplary aspects.
Figure 6B:
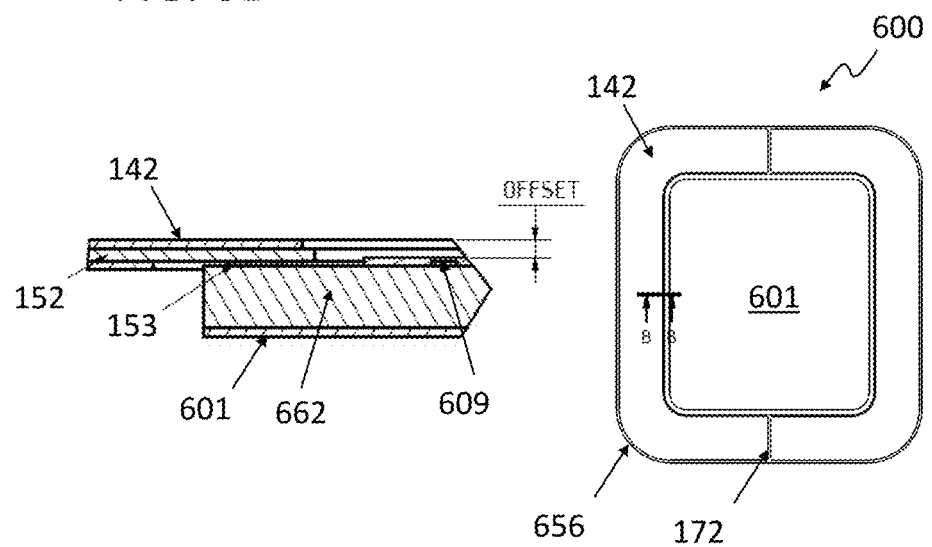
Figure 6C:
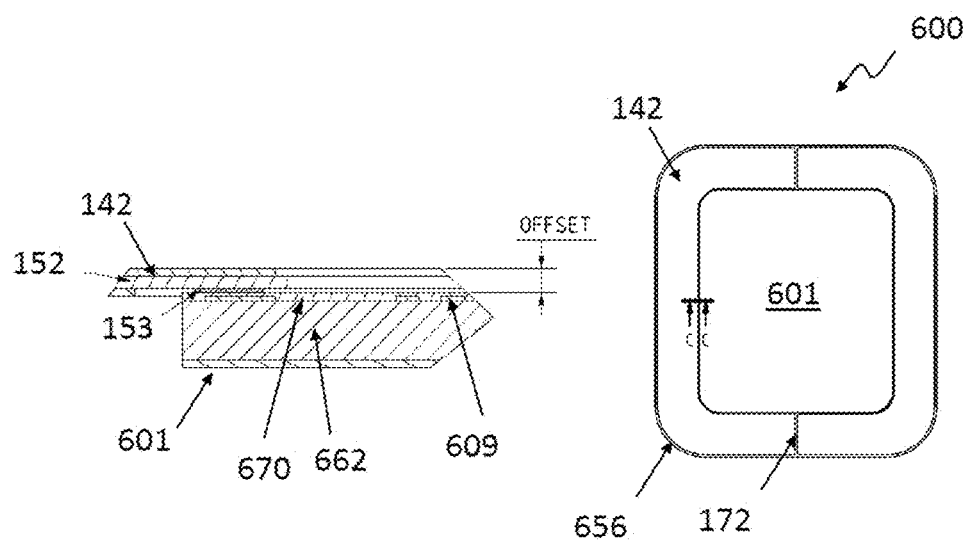
Figure 9:
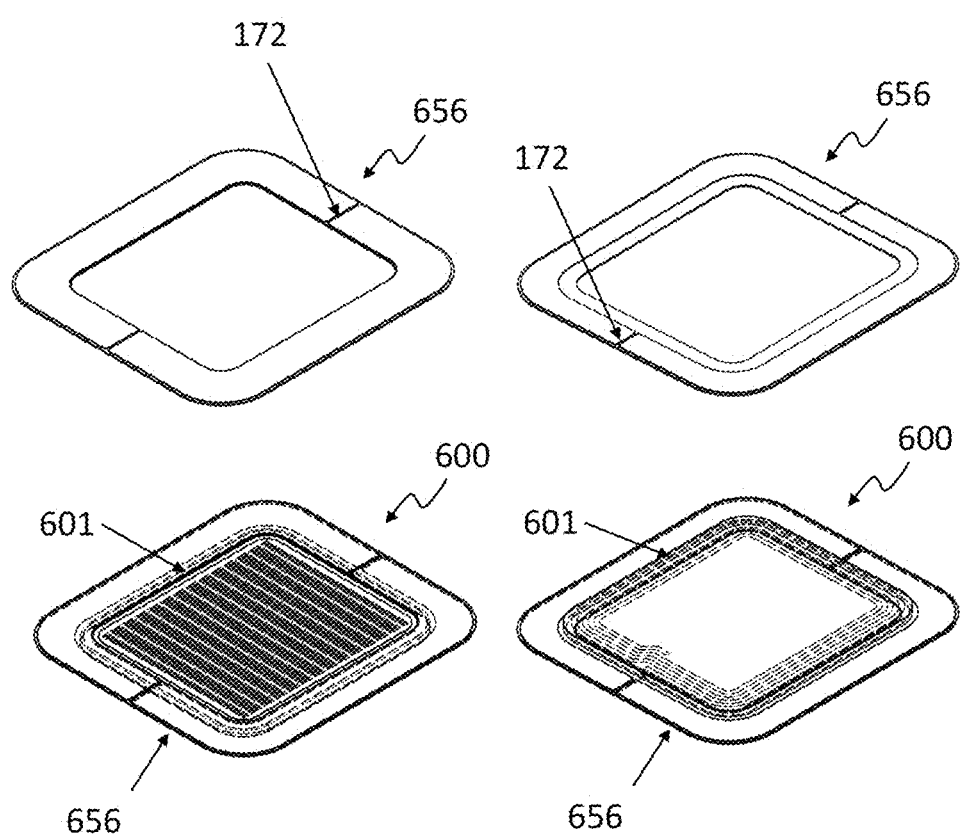
FIG. 9 shows schematic perspective plan views of a front side and a rear side of a sensor device (at the bottom) and a carrier component of the sensor device prior to coupling to the sensor component (at the top) in order to form a carrier tape in accordance with various exemplary aspects.

FIGS. 6A to 6C each show a schematic plan view with a partial cross-sectional view of a sensor device 600 which is inserted into a carrier tape in accordance with various exemplary aspects. FIGS. 7A to 7D each show a schematic perspective plan view of the front side of a sensor device 600 in accordance with various exemplary aspects, wherein FIG. 7D additionally shows a schematic perspective plan view of the rear side of the sensor component 601 and an enlarged illustration of a partial region. FIG. 8 shows a schematic plan view of a front side and a rear side of a carrier tape 800 (at the top) and a front view of a carrier tape 801 with a plurality of sensor devices 600 in accordance with various exemplary aspects (at the bottom). FIG. 9 shows schematic perspective plan views of a front side and a rear side of a sensor device 600 (at the bottom) and a carrier component 656 prior to coupling to the sensor component 601 in order to form a carrier tape 801 in accordance with various exemplary aspects. FIG. 10 shows a schematic plan view of a chip card 1000 in accordance with various exemplary aspects with a cross-sectional view of a partial region and an illustration of a process of mounting the sensor device 600 in the chip card body 332.

In various exemplary aspects, a carrier tape 801 is provided. The carrier tape 801 comprises a plurality of sensor devices 600.

Without the sensor devices, the carrier tape is designated by the reference sign 800 and corresponds, as explained above in association with FIG. 2, to a standard 35 mm carrier tape for roll-to-roll production of chip card modules. Differences between the carrier tapes 800 and 201 without sensor devices and the carrier tapes 200 and/or 801 provided with the sensor devices 100 and/or 600, respectively, are explained below.

In the exemplary aspects in accordance with FIGS. 7A to 10 as well, the sensor device 600 is formed by means of coupling a carrier component (the carrier tape 800) and a sensor component 601 and is provided for simple further processing with roll-to-roll devices currently used.

Apart from the differences explained, properties, materials, etc. of the sensor devices 100 and/or 600, of the carrier tapes 800, 201 and of the chip cards 300, 1000 can be substantially identical or similar.

Each of the sensor devices 600 can comprise a fingerprint sensor 609 and an antenna 672 coupled to the fingerprint sensor 609, for inductively coupling the fingerprint sensor 609 to a booster antenna 330.

The fingerprint sensor 609 can comprise a sensor area having a multiplicity of sensor pads. This can constitute a significant difference between the fingerprint sensor 609 used in the exemplary aspects in FIGS. 7A to 10 and the fingerprint sensor 109 in FIGS. 1A to 6C.

The fingerprint sensor 609 can comprise a sensor area having the multiplicity of sensor pads, which can be arranged in rows and columns. The sensor pads can thus form an X*Y sensor array for detecting fingerprints.

The fingerprint sensor 609 can be arranged on a PCB substrate 662.

Figure 7A:
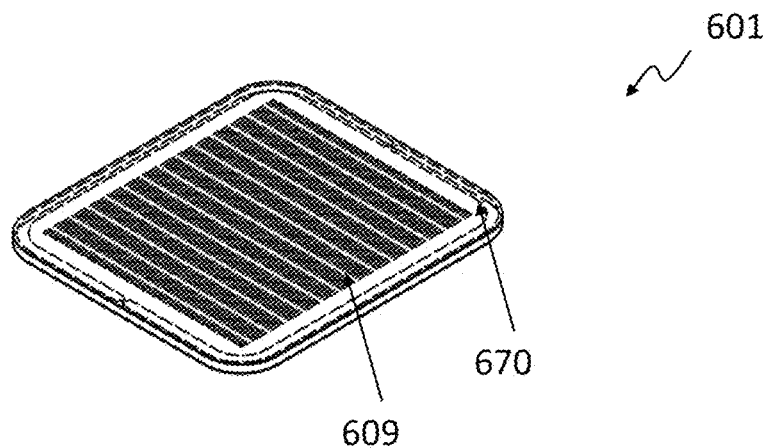
FIGS. 7A to 7D each show a schematic perspective plan view of the front side of a sensor device which is inserted into a carrier tape in accordance with various exemplary aspects from FIG. 8.
Figure 7B:
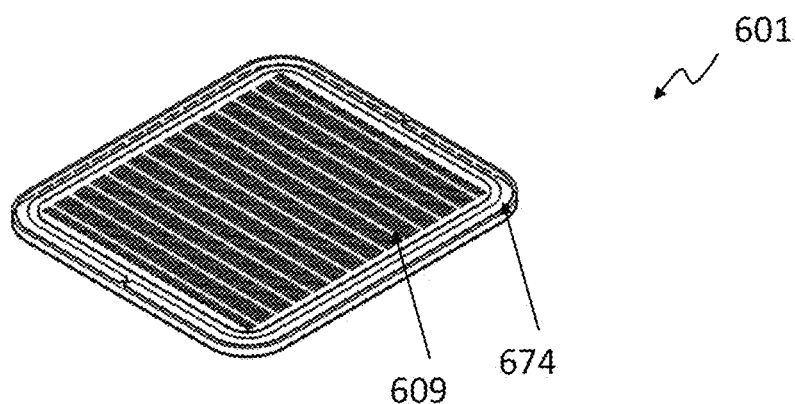
Figure 7C:
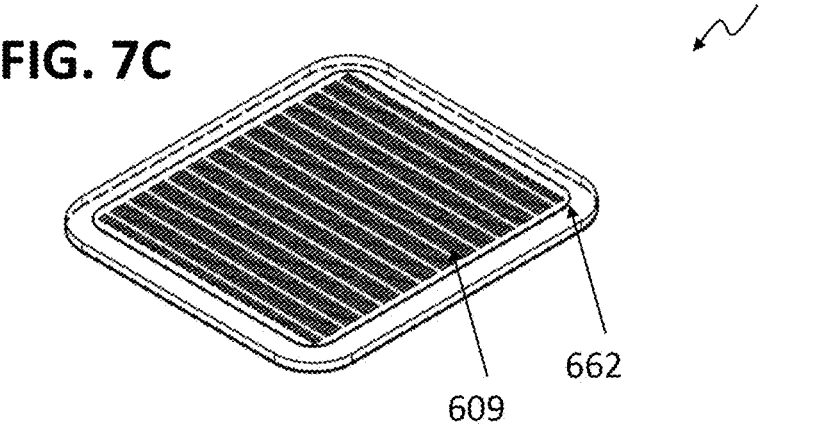
Figure 7D:
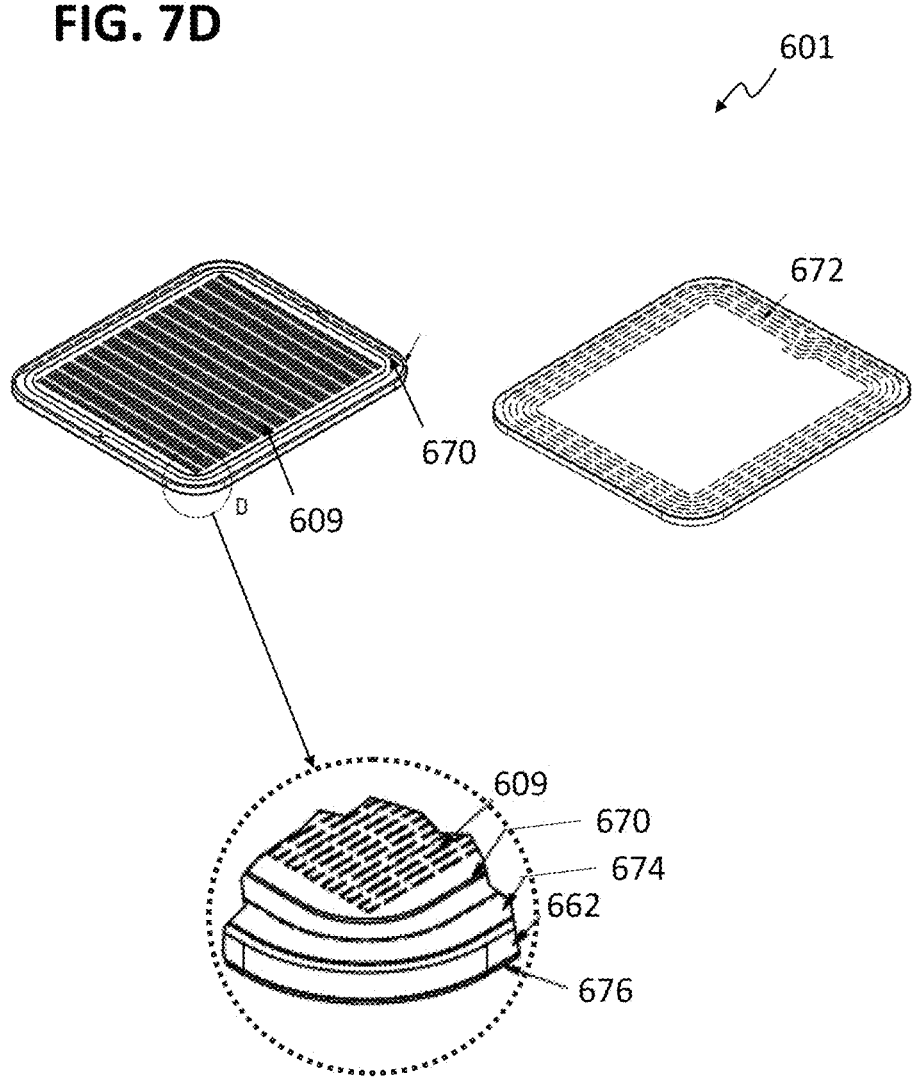

FIG. 7D illustrates a layer construction of the fingerprint component 601.

Below the fingerprint sensor 609, which can be provided with a thin protective layer, there can be arranged (for example in this order) an upper solder mask 670, an upper metal layer 674, a substrate 662 (e.g. a PCB substrate) and a lower solder mask 676.

Corners of the sensor component 601 can be rounded. That can simplify insertion of the sensor component 601 into a milled-out opening in a chip card 1000.

The (PCB) substrate 662 can comprise additional metal layers, grounding and voltage supply lines or areas. In addition, active and passive circuit elements can be embedded into the substrate 662, these not being illustrated here.

In contrast to the sensor component 101, the sensor component 601 can itself be equipped with the antenna 672 for coupling to a coupling region 330K of a booster antenna 330, which can be arranged in a chip card body 332. The antenna can be formed for example on a side of the sensor component 601 facing away from the sensor area, for example in an edge region. In this respect, see FIG. 7D for example.

Furthermore, in the case of the PCB-based fingerprint sensor 601 having the plurality of sensor pads, it is generally not necessary to apply a grounding potential to the finger.

In a similar manner to the carrier component 156, the carrier component 656 can comprise at its top side a metal area 142, in the case of which it is not necessary to attach it to the sensor component 601 by means of an electrically conductive connection.

The metal area 142 can serve for example as a mounting area, as definition for where the sensor device 600 to be singulated from the carrier tape 801 ends, and/or for mechanical stabilization. Optionally, for example for protection against electrostatic charge, grounding potential can be applied to the metal area 142.

The carrier component 656, which can be formed as the carrier tape 800, for example, can comprise a substrate 152, for example a reinforced epoxy tape or a polyimide tape, which can be provided with an upper metallization 142 and a lower metallization 661. The upper metallization 142 and the lower metallization 661 can comprise copper (Cu) for example, which can be coated for example with nickel (Ni), gold (Au), palladium (Pd) or, for example, a CuSnZn alloy (e.g. MIRALLOY®) or other alloys thereof. The metallization can comprise the same materials or different materials on the top side and on the underside.

For the sake of better clarity, FIG. 9 illustrates the carrier component 656 as an individual carrier component 656, although the latter actually forms a part of the carrier tape 800.

Here, too, as described above with regard to the carrier component 156, attention is drawn to the fact that the metallizations 142, 661 on the carrier component 656 do not form closed rings, but rather an open ring or ring segments. For this purpose, gaps 172 can be formed, for example by means of etching or other suitable methods used for structuring the metallization.

The lower row in FIG. 9 illustrates the sensor device 600 formed by means of the sensor component 601 being joined together with the carrier component 656.

For securing to one another, a securing material 153 is used. That is illustrated in FIGS. 6A to 6C.

Depending on what method is used for fitting the sensor component 601 to the carrier component 656, the securing material 153 can vary and comprise for example nonconductive adhesives, conductive adhesives (isotropic or anisotropic), solder alloys and/or hotmelt materials.

An (e.g. outer) edge region of the sensor component 601 can be secured to an (e.g. inner) edge region delimiting a through opening 170 of a carrier tape body 220. A width of the respective region secured to one another can be between 0.2 mm and 1.2 mm, for example.

In FIG. 7A, the edge region of the sensor component 601 is completely covered with a solder mask material 670.

FIG. 6C illustrates a connection between such a sensor component and a carrier component 656, in the case of which the substrate 152 is exposed and connected to the solder mask 670.

In FIG. 7B, the edge region of the sensor component 601 has metal structures in the upper metal layer 674. The edge region is free of solder mask material 670. This exemplary aspect can be used to form an electrically conductive connection between the sensor component 601 and the carrier component 656. In order to ensure that the inductive coupling of the antenna 672 is not disturbed by the metal structures 674, the metal structures, as explained above, should not be formed as a closed ring.

In various exemplary aspects, as illustrated in FIG. 6A, metal structures can likewise be formed in the edge region of the carrier component 656.

In FIG. 7C, the edge region of the sensor component 601 is free of the upper solder mask 670 and also free of the upper metal layer. Accordingly, the substrate 662 is exposed in the edge region. The region of the carrier component 656 that is to be coupled thereto can either have metal structures, for example for forming an electrically conductive connection between the sensor component 601 and the carrier component 656, or be free of metal. By way of example, an adhesive (conductive or insulating) can be used for securing purposes.

FIG. 6B illustrates a connection of substrate to substrate. By way of example, an adhesive 153 can be used for this purpose.

What types of coating are used for the contact areas and what securing material 153 is used can have an influence on the offset between a surface of the fingerprint sensor 609 and a surface of the carrier component 656, said offset being marked in each case in FIGS. 6A to 6C. The offset is furthermore influenced by a thickness of the metal layers 142, 661 of the carrier component 656 and the thickness of the substrate 152 thereof.

Implanting the assembled sensor unit 600 into the chip card body 332 can be effected after the sensor unit 600 has been singulated from the carrier tape 801, for example (as explained above with regard to the carrier tape 200) by means of stamping, milling, cutting or the like.

Embedding the sensor unit 600 into the chip card, which is illustrated in FIG. 10, can be effected by means of a hotmelt process, for example. The hotmelt implanting process is a standard process in chip card manufacturing and is thus generally available and suitable for volume production.

An opening 1010, 1012, into which the sensor unit 600 is introduced, can comprise a shallower opening 1012 and a deeper opening 1010, wherein the (thicker) sensor component 601 is introduced into the deeper opening 1010, and the carrier component 656 is secured by its underside to the bottom of the shallower opening 1010 by means of an adhesion medium 1014, for example by means of the hotmelt process. This is illustrated in the cross-sectional view in FIG. 10.

Further properties of the chip card 1000 correspond to those which have been explained in association with the chip card 300.

FIG. 13 shows a flow diagram 1300 of a method for forming a sensor device in accordance with various exemplary aspects.

The method can comprise coupling a fingerprint sensor comprising a sensor area with a multiplicity of sensor pads to an antenna (1310), wherein inductive coupling of the fingerprint sensor to a booster antenna is effected (1320).

The method can furthermore comprise forming a through opening in a carrier body and arranging the fingerprint sensor in the through opening.

In this case, the carrier body can be a carrier tape body (for example a standard 35 mm carrier tape body), having the through opening in which the fingerprint sensor is arranged, and at least one further through opening, in which at least one further fingerprint sensor is arranged.

The method can furthermore comprise singulating the sensor device by means of severing the carrier tape body.

Figure 11A:
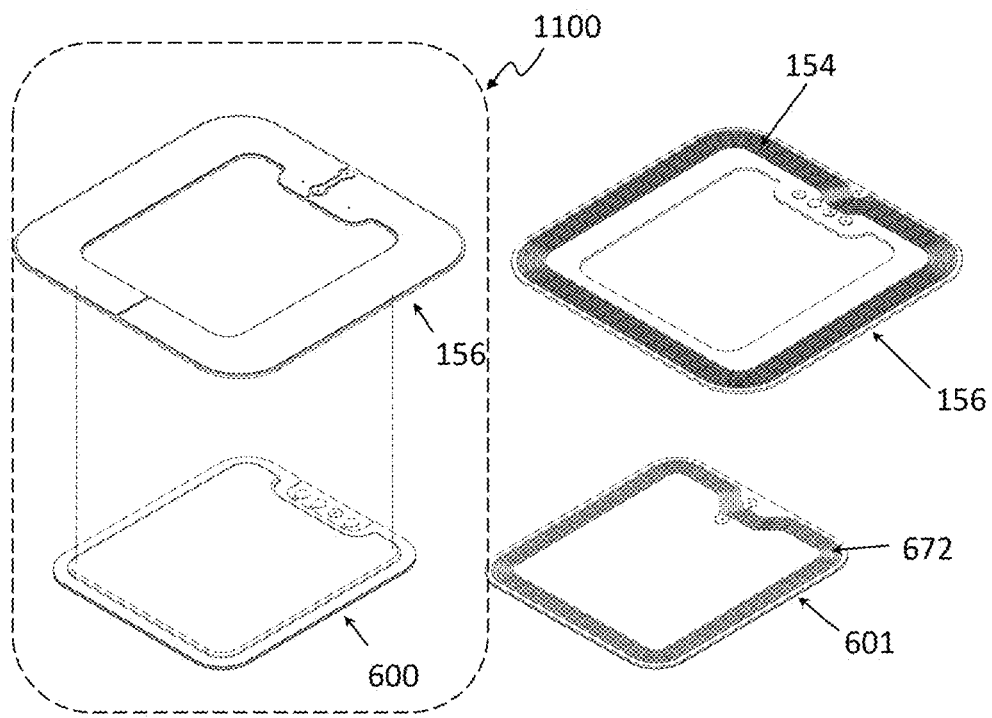
FIG. 11A shows a perspective exploded illustration of a sensor device in accordance with various exemplary aspects together with views from below of the elements to be joined together.

FIG. 11A shows a perspective exploded illustration of a sensor device 1100 in accordance with various exemplary aspects.

In the case of the sensor device 1100, the sensor component 601 having the integrated antenna 672 is combined with the carrier component 156 having the antenna 154. That is illustrated in views showing the two components 601, 156 from below.

Figure 11B:
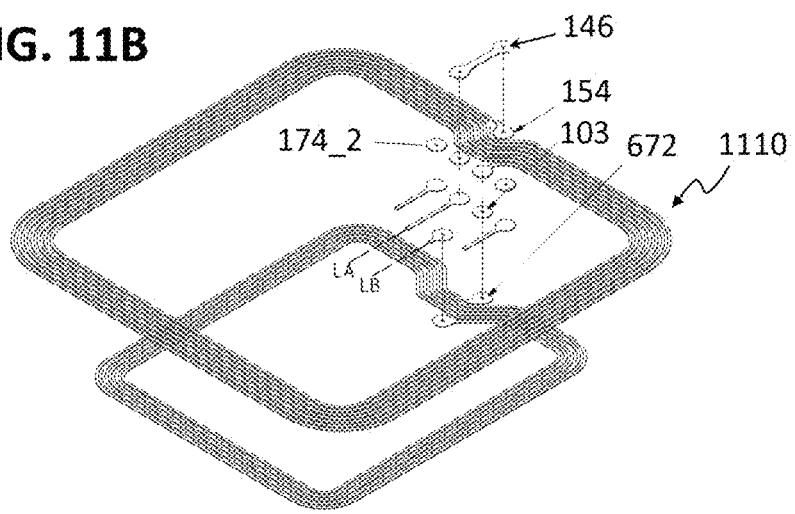
FIG. 11B shows a schematic illustration of the antennas of the sensor device from FIG. 11A.

In various exemplary aspects, the antenna 672 of the sensor component 601 and the antenna 154 of the carrier component 156 are electrically conductively connected to one another. FIG. 11B schematically shows only the antennas 154, 672, which form a common antenna 1110, as an exploded view including the connections between the antennas 154, 672 (the bridge 146, the contact pads 174, the contacts 103 and through contacts that connect them and are indicated as broken lines).

In various exemplary aspects, the antenna 1110 can have better transmission properties than each of the antennas 154, 672 on their own.

Further properties, production methods etc. correspond to those which have been explained above with regard to the other exemplary aspects, and so repetition is dispensed with here.

Some exemplary aspects are specified in summary below.

Exemplary aspect 1 is a sensor device. The sensor device comprises a fingerprint sensor comprising a silicon-based area sensor, a sensor area and an electrically conductive contact region arranged laterally adjacent to the sensor area and configured to be touched upon the contact area being touched by a finger in order to bring the finger to a predetermined potential, and an antenna coupled to the fingerprint sensor, for inductively coupling the fingerprint sensor to a booster antenna.

Exemplary aspect 2 is a sensor device according to exemplary aspect 1, wherein the fingerprint sensor is a capacitive sensor.

Exemplary aspect 3 is a sensor device according to exemplary aspect 2, wherein the electrically conductive contact region is formed as an interrupted ring or as a plurality of segments.

Exemplary aspect 4 is a sensor device according to exemplary aspect 2 or 3, wherein the antenna is arranged under the electrically conductive contact region.

Exemplary aspect 5 is a sensor device according to any of exemplary aspects 1 to 4, wherein the fingerprint sensor comprises a sensor chip, configured for processing detected sensor signals.

Exemplary aspect 6 is a sensor device according to any of exemplary aspects 1 to 5, which furthermore comprises a second chip, wherein the second chip is configured for communication with an apparatus external to the sensor device, wherein the antenna is electrically conductively connected to the second chip.

Exemplary aspect 7 is a sensor device according to exemplary aspect 6, wherein the second chip is configured as a secure element.

Exemplary aspect 8 is a sensor device according to any of exemplary aspects 1 to 7, which is configured as a coil-on-module device.

Exemplary aspect 9 is a sensor device according to any of exemplary aspects 1 to 8, which furthermore comprises a contact-based interface for contact-based communication.

Exemplary aspect 10 is a carrier tape comprising a plurality of sensor devices according to any of exemplary aspects 1 to 3.

Exemplary aspect 11 is a carrier tape according to exemplary aspect 10, wherein the carrier tape is a standard 35 mm carrier tape for roll-to-roll production of chip modules.

Exemplary aspect 12 is a carrier tape according to exemplary aspect 11, which furthermore comprises a carrier tape body having a plurality of through openings, wherein one of the fingerprint sensors is arranged in each of the through openings.

Exemplary aspect 13 is a carrier tape according to exemplary aspect 12, wherein the antenna of a respective sensor device of the plurality of sensor devices is formed on the carrier tape body such that it surrounds the through opening in which the fingerprint sensor is arranged.

Exemplary aspect 14 is a carrier tape according to exemplary aspect 12 or 13, wherein the sensor device comprises the electrically conductive contact region according to exemplary aspects 2 to 9, and wherein the electrically conductive contact region of a respective sensor device of the plurality of sensor devices is formed on the carrier tape body such that it surrounds the through opening in which the fingerprint sensor is arranged.

Exemplary aspect 15 is a carrier tape. The carrier tape comprises a plurality of sensor devices, wherein each of the sensor devices comprises a fingerprint sensor, and an antenna coupled to the fingerprint sensor, for inductively coupling the fingerprint sensor to a booster antenna, wherein the fingerprint sensor comprises a sensor area with a multiplicity of sensor pads.

Exemplary aspect 16 is a chip card. The chip card comprises a chip card body, a sensor device according to any of exemplary aspects 1 to 10 embedded into the chip card body, and a booster antenna embedded into the chip card body with a coupling region for inductive coupling to the antenna of the sensor device.

Exemplary aspect 17 is a chip card according to exemplary aspect 16, wherein the coupling region is arranged around the sensor device.

Exemplary aspect 18 is a chip card according to exemplary aspect 16, wherein the coupling region is arranged under the antenna of the sensor device.

Exemplary aspect 19 is a chip card according to any of exemplary aspects 16 to 18, wherein the sensor device is formed according to exemplary aspect 9, and wherein the chip card furthermore comprises a further chip, which is arranged in the chip card body and is electrically conductively coupled to the contact-based interface.

Exemplary aspect 20 is a method for forming a sensor device. The method comprises coupling a fingerprint sensor comprising a silicon-based area sensor to an antenna for inductively coupling the fingerprint sensor to a booster antenna, and forming an electrically conductive contact region on the carrier body adjacent to the through opening in such a way that after the fingerprint sensor has been arranged in the through opening, the contact region is arranged laterally adjacent to the sensor area and is configured to be touched upon the contact area being touched by a finger in order to bring the finger to a predetermined potential.

Exemplary aspect 21 is a method according to exemplary aspect 20, which furthermore comprises forming a through opening in a carrier body, forming the antenna in a manner surrounding the through opening on or in the carrier body and arranging the fingerprint sensor in the through opening.

Exemplary aspect 22 is a method according to exemplary aspect 21, wherein the electrically conductive contact region is formed as an interrupted ring or as a plurality of segments.

Exemplary aspect 23 is a method according to exemplary aspect 21 or 22, wherein the antenna is arranged under the electrically conductive contact region.

Exemplary aspect 24 is a method according to any of exemplary aspects 20 to 23, which furthermore comprises electrically conductively connecting a second chip to the antenna, wherein the second chip is configured for communication with an apparatus external to the sensor device.

Exemplary aspect 25 is a method according to any of exemplary aspects 20 to 24, which furthermore comprises arranging the fingerprint sensor on a sensor carrier, in such a way that the sensor carrier has an edge region extending laterally beyond the fingerprint sensor, wherein arranging the fingerprint sensor in the through opening comprises connecting the edge region of the sensor carrier to the carrier body.

Exemplary aspect 26 is a method according to exemplary aspect 25, wherein the connecting comprises soldering or adhesive bonding by means of an electrically conductive adhesive and/or by means of an electrically insulating adhesive.

Exemplary aspect 27 is a method according to exemplary aspect 26, wherein the connecting comprises soldering or adhesive bonding by means of the electrically conductive adhesive, and wherein coupling the fingerprint sensor to the antenna is effected by means of the connecting.

Exemplary aspect 28 is a method according to exemplary aspect 26, wherein the connecting comprises adhesive bonding by means of the electrically insulating adhesive, and wherein coupling the fingerprint sensor to the antenna furthermore comprises electrically conductively connecting the fingerprint sensor and the antenna by means of an electrically conductive connection element.

Exemplary aspect 29 is a method for forming a sensor device. The method comprises coupling a fingerprint sensor comprising a sensor area with a multiplicity of sensor pads to an antenna for inductively coupling the fingerprint sensor to a booster antenna.

Exemplary aspect 30 is a method according to exemplary aspect 29, which furthermore comprises forming a through opening in a carrier body, and arranging the fingerprint sensor in the through opening.

Exemplary aspect 31 is a method according to any of exemplary aspects 20 to 30, wherein the carrier body is a carrier tape body having the through opening in which the fingerprint sensor is arranged, and at least one further through opening, in which at least one further fingerprint sensor is arranged, wherein the method further comprises singulating the sensor device by means of severing the carrier tape body.

Exemplary aspect 32 is a method according to exemplary aspect 31, wherein the severing comprises stamping.

Exemplary aspect 33 is a method for forming a chip card. The method comprises arranging a booster antenna with a coupling region for inductive coupling to an antenna of a sensor device into a chip card body and inserting a sensor device according to any of exemplary aspects 1 to 9 into the chip card body.

Further advantageous configurations of the device are evident from the description of the method, and vice versa.

What is claimed is:

1. A carrier tape, comprising:
   a plurality of sensor devices, each of the sensor devices comprising:
      a fingerprint sensor, comprising:
         a silicon-based area sensor;
         a sensor area; and
         an electrically conductive contact region arranged laterally adjacent to the sensor area and configured to be touched upon the contact region being touched by a finger in order to bring the finger to a predetermined potential; and
      an antenna coupled to the fingerprint sensor to inductively couple the fingerprint sensor to a booster antenna; and
   a carrier tape body having a plurality of through openings, wherein one of the fingerprint sensors is arranged in each of the through openings,
   wherein the antenna of a respective sensor device of the plurality of sensor devices is formed on the carrier tape body such that it surrounds the through opening in which the fingerprint sensor is arranged.

2. The sensor device as claimed in claim 1,
   wherein the electrically conductive contact region is formed as an interrupted ring or as a plurality of segments.

3. The sensor device as claimed in claim 1,
   wherein the antenna of a respective sensor device of the plurality of sensor devices is arranged under the respective electrically conductive contact region.

4. A carrier tape, comprising:
   a plurality of sensor devices, each of the sensor devices comprising:
      a fingerprint sensor, comprising:
         a silicon-based area sensor,
         a sensor area; and
         an electrically conductive contact region arranged laterally adjacent to the sensor area and configured to be touched upon the contact region being touched by a finger in order to bring the finger to a predetermined potential; and
      an antenna coupled to the fingerprint sensor to inductively couple the fingerprint sensor to a booster antenna, wherein the antenna is arranged under the electrically conductive contact region, and
   a carrier tape body having a plurality of through openings, wherein one of the fingerprint sensors is arranged in each of the through openings,
   wherein the electrically conductive contact region of a respective sensor device of the plurality of sensor devices is formed on the carrier tape body such that it surrounds the through opening in which the fingerprint sensor is arranged.

5. A carrier tape, comprising:
   a plurality of sensor devices, wherein each of the sensor devices comprises:
      a fingerprint sensor; and
      an antenna coupled to the fingerprint sensor to inductively couple the fingerprint sensor to a booster antenna,
      wherein the fingerprint sensor comprises a sensor area with a multiplicity of sensor pads; and a carrier tape body having a plurality of through openings, wherein one of the fingerprint sensors is arranged in each of the through openings, and wherein the antenna of a respective sensor device of the plurality of sensor devices is formed on the carrier tape body such that it surrounds the through opening in which the fingerprint sensor is arranged.

6. A method for forming a sensor device, comprising:

forming a through opening in a carrier body;

forming an antenna in a manner surrounding the through opening on or in the carrier body;

arranging a fingerprint sensor in the through opening;

coupling the fingerprint sensor comprising a silicon-based area sensor to the antenna to inductively couple the fingerprint sensor to a booster antenna; and forming an electrically conductive contact region on the carrier body adjacent to the through opening in such a way that after the fingerprint sensor has been arranged in the through opening, the contact region is arranged laterally adjacent to the sensor area and is configured to be touched upon the contact region being touched by a finger in order to bring the finger to a predetermined potential.

7. The method as claimed in claim 6, further comprising arranging the fingerprint sensor on a sensor carrier in such a way that the sensor carrier has an edge region extending laterally beyond the fingerprint sensor, wherein arranging the fingerprint sensor in the through opening comprises connecting the edge region of the sensor carrier to the carrier body.

8. The method as claimed in claim 7, wherein the connecting comprises soldering or adhesive bonding by means of an electrically conductive adhesive or by means of an electrically insulating adhesive.

9. The method as claimed in claim 8, wherein the connecting comprises soldering or adhesive bonding by means of the electrically conductive adhesive, and wherein coupling the fingerprint sensor to the antenna is effected by means of the connecting.

10. The method as claimed in claim 8, wherein the connecting comprises adhesive bonding by means of the electrically insulating adhesive, and wherein coupling the fingerprint sensor to the antenna further comprises electrically conductively connecting the fingerprint sensor and the antenna by means of an electrically conductive connection element.

\* \* \* \* \*